United States Patent
Akahori (10) Patent No.: US 7,864,664 B2
(45) Date of Patent: Jan. 4, 2011

(54) DELAY PROFILE GENERATOR

(75) Inventor: Hiroji Akahori, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 323 days.

(21) Appl. No.: 12/235,818

(22) Filed: Sep. 23, 2008

(65) Prior Publication Data

US 2009/0092200 A1 Apr. 9, 2009

(30) Foreign Application Priority Data

Oct. 5, 2007 (JP) .............................. 2007-262151

(51) Int. Cl.
*H04J 11/00* (2006.01)
*H04L 27/28* (2006.01)

(52) U.S. Cl. ...................... 370/210; 370/252; 370/350; 375/260; 375/340

(58) Field of Classification Search ....................... None
See application file for complete search history.

(56) References Cited

U.S. PATENT DOCUMENTS 6,618,452 B1* 9/2003 Huber et al. ................. 375/343
7,099,270 B2* 8/2006 Yamaguchi ................. 370/208
7,580,466 B2* 8/2009 Ido ............................. 375/260
7,664,189 B2* 2/2010 Kawauchi .................... 375/260
7,701,841 B2* 4/2010 Kawauchi et al. ........... 370/210
7,706,479 B2* 4/2010 Adachi ....................... 375/340
2007/0036231 A1* 2/2007 Ido ............................. 375/260
2007/0070882 A1* 3/2007 Kawauchi et al. ........... 370/210
2007/0177685 A1* 8/2007 Kawauchi .................... 375/260
2008/0101490 A1* 5/2008 Kawauchi et al. ........... 375/260
2008/0165871 A1* 7/2008 Kisoda et al. ............... 375/260

FOREIGN PATENT DOCUMENTS

JP 2006352314 12/2006

* cited by examiner

*Primary Examiner*—Steven H Nguyen
(74) *Attorney, Agent, or Firm*—Volentine & Whitt, PLLC (57) ABSTRACT

A delay profile generator that includes a delay profile generating component, a delay profile extracting component, an integrating component, a comparing component and a correcting component, is provided. The integrating component, in the delay profile extracted by the delay profile extracting component, integrates a signal component of a delay profile of a first time period, and integrates a signal component of a delay profile of a second time period that does not overlap the first time period. The comparing component compares integration values of the two time periods obtained by the integrating component. The correcting component corrects a time position of the delay profile window on the basis of results of comparison of the comparing component.

10 Claims, 8 Drawing Sheets

DELAY PROFILE GENERATOR

CROSS-REFERENCE TO RELATED APPLICATION

This application claims priority under 35 USC 119 from Japanese Patent Application No. 2007-262151, the disclosure of which is incorporated by reference herein.

BACKGROUND OF THE INVENTION

1. Field of the Invention

The present invention relates to a delay profile generator that generates a delay profile in an OFDM modulating system using scattered pilots such as ISDB-T or the like.

2. Description of the Related Art

In recent years, the OFDM (Orthogonal Frequency Division Multiplexing) modulating system has been used as a modulating system in terrestrial digital broadcasting and the like.

Figure 4:
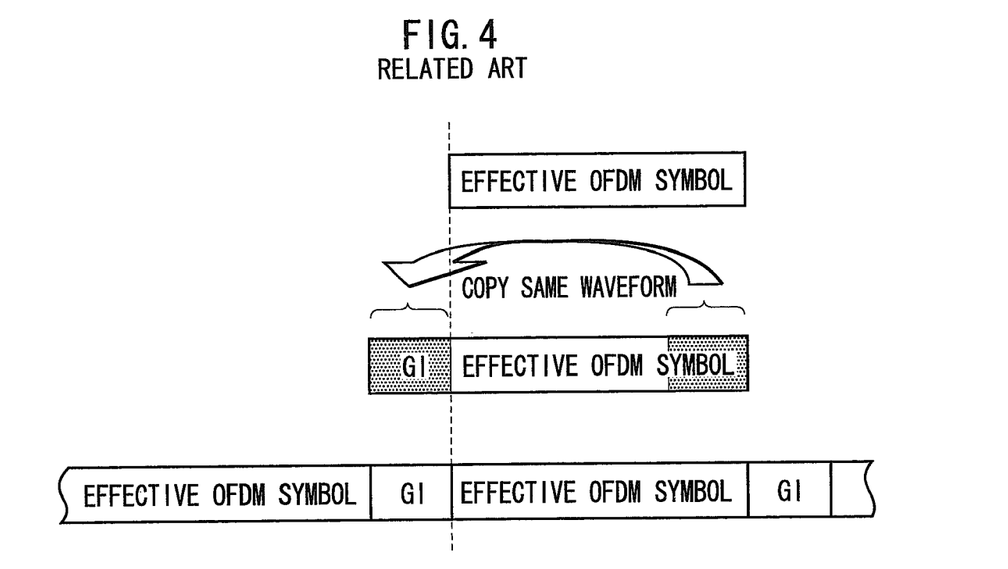
FIG. 4 is a drawing explaining the format of an OFDM signal.

In the OFDM modulating system, symbols are transmitted by using plural sub-carriers (carriers) whose central frequencies are different. One symbol period is structured by a guard interval being attached to an effective symbol period. In the OFDM modulating system, as shown in FIG. 4, a portion of the effective symbol signal which is the object of demodulation in actuality is copied, and is inserted between effective symbol signals as a repeating waveform. The effects of multipath interference due to delay waves arising are thereby suppressed. The time period of this copied waveform is a guard interval (GI).

When demodulating the OFDM signal, the received OFDM signal is digitally converted by an A/D converter, the guard interval is eliminated, and the effective symbol signal is taken-out and demodulated by FFT (a Fast Fourier Transformer).

Further, in the OFDM modulating system, a scattered pilot system is used. In the scattered pilot system, pilot symbols are scattered among the data symbols in the frequency direction and in the time direction by using the amplitude or phase as the reference, the signal is modulated and transmitted and demodulation is carried out by using the pilot symbols at the receiving side by carrying out transfer path characteristic estimation.

In the transfer path estimation, a delay profile, that shows the delay time distribution of the delay wave, is generated. The delay profile is generated by extracting the pilot symbols from the results of the FFT processing and carrying out IFFT (Inverse Fast Fourier Transform) processing by using the extracted pilot symbols.

Figure 5:
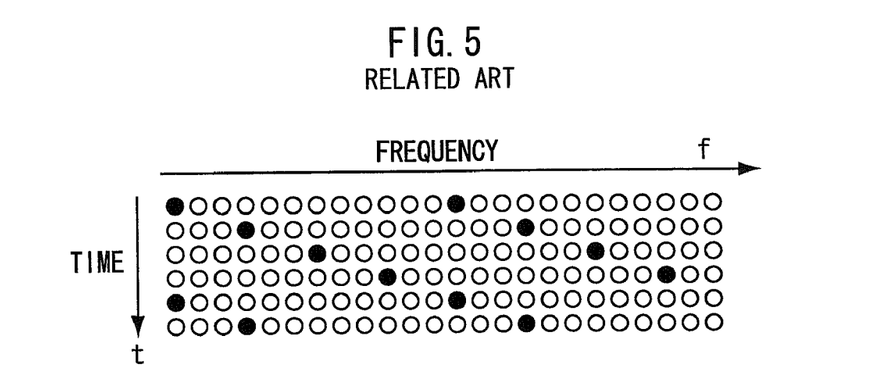
FIG. 5 is a drawing showing a frame structure example that shows the arrangement relationship of pilot symbols and data symbols in a scattered pilot system.

Note that, from the physical properties, the maximum time length of a delay profile that can be computed corresponds to the product of the reciprocal of the subcarrier interval at which the pilot symbols are arranged and the effective OFDM symbol length. In ISDB-T and the like, there is a symbol array such as shown in FIG. 5. Time (the OFDM symbols) is shown on the vertical axis in FIG. 5, and frequency on the horizontal axis. The black dots in FIG. 5 represent pilot symbols, and the white dots represent data symbols. In this example, the same symbol arrangement appears at one cycle in four OFDM symbols. In the example shown in FIG. 5, if a delay profile is generated by using four successive OFDM symbols or more, the subcarrier interval at which the pilot symbols are arrayed is three subcarriers, and the maximum time length of the delay profile that can be computed is ⅓ of the effective OFDM symbol length.

Figure 6A:
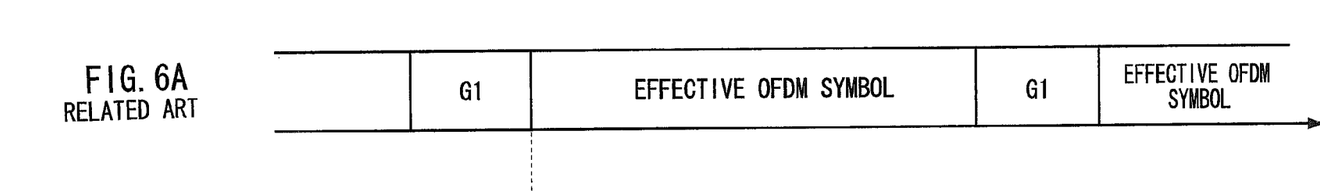
FIGS. 6A through 6C are explanatory drawings explaining processings of generating a delay profile from an OFDM signal, and extracting path information by using a delay profile window.
Figure 6B:
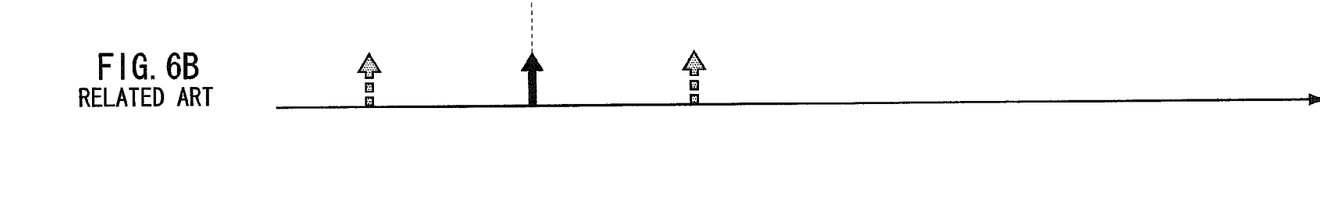

FIG. 6A shows a received OFDM signal, and FIG. 6B shows the delay profile generated from the OFDM signal shown in FIG. 6A. In the example described above, the time length of the delay profile that can be computed is ⅓ of the OFDM symbol, and output that exists in the time region other than the ⅓ is unnecessary path information that is generated by repeated cycles. The solid arrows show correct path information, and the dashed arrows show unnecessary path information.

Figure 6C:
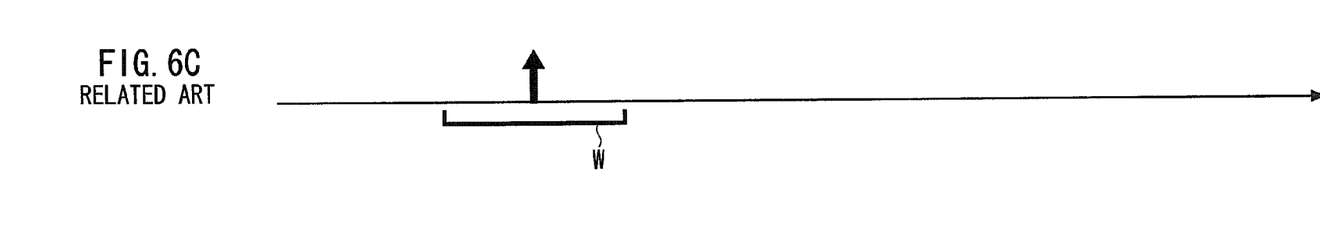

In conventional techniques, in generating a delay profile, the time position (see FIG. 6C) of a delay profile window W (the window showing the time position for extracting the needed path information) is determined from two time positions which are the time position of the FFT window at the time of OFDM demodulating the received signal (the window expressing the time position of the FFT computation) and a reference time position of the delay profile window W.

Note that the time position of the FFT window is determined by using, as a reference, a time position determined by a correlator. The reference time position of the delay profile window W is determined fixedly from the time position of the delay profile that is assumed (see, for example, Japanese Patent Application Laid-Open (JP-A) No. 2006-352314). Because the reference time position of the delay profile window W is fixed in this way, it can be said that, conventionally, the time position of the delay profile window W is determined in accordance with the results of the correlator.

Figure 7A:
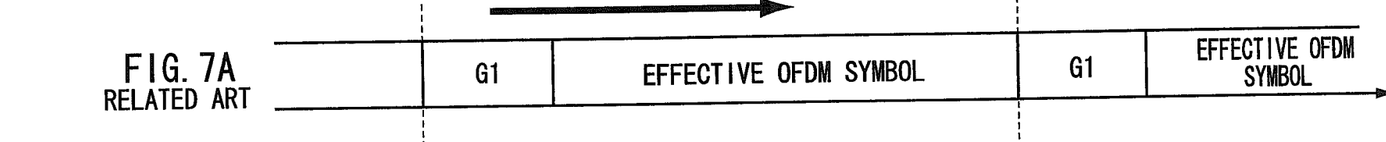
FIGS. 7A through 7C are explanatory drawings explaining a determining method at a time of determining the correlation value between a received OFDM signal, and a signal in which the OFDM signal is delayed by an effective symbol period length.
Figure 7B:
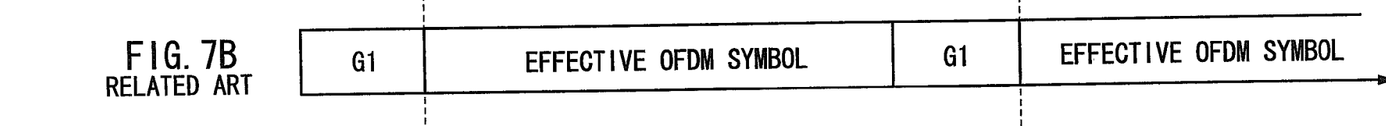
Figure 7C:
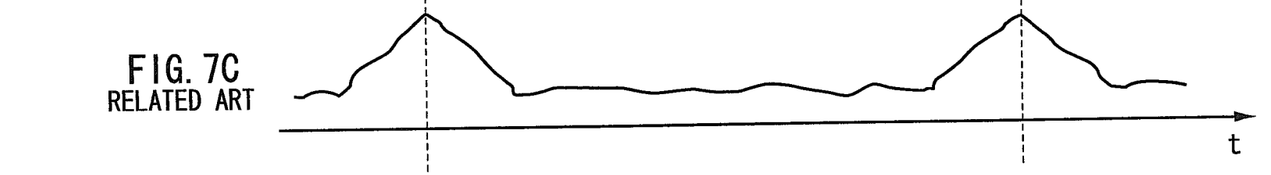

As shown in FIG. 7A through FIG. 7C, a conventional correlator determines the correlation value (see FIG. 7C) between the received OFDM signal (see FIG. 7A) and the signal (see FIG. 7B) that is that OFDM signal delayed by the effective symbol time length. Then, the maximum value of the value integrating the correlation value is extracted, the time position of that maximum value is detected, and the time position of the FFT window is determined by using that time position as a reference.

Figure 8A:
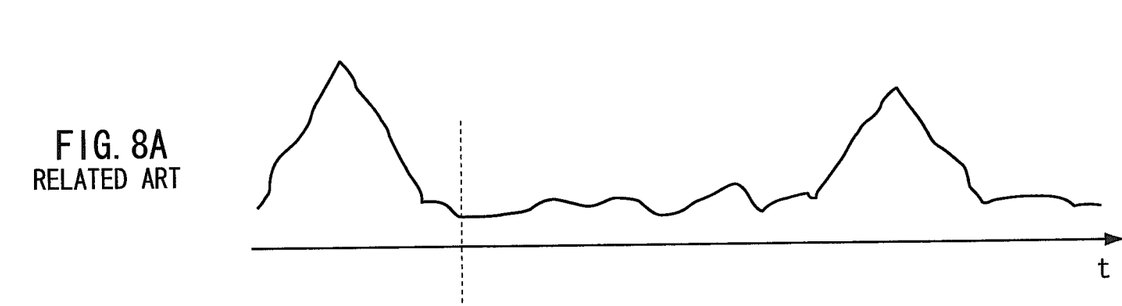
FIGS. 8A through 8C are drawings showing an example of a correlation signal obtained by a correlator in a case in which multipath occurs.
Figure 8B:
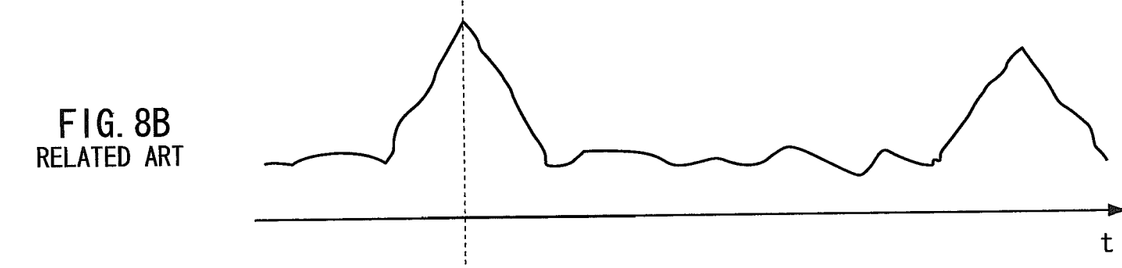
Figure 8C:
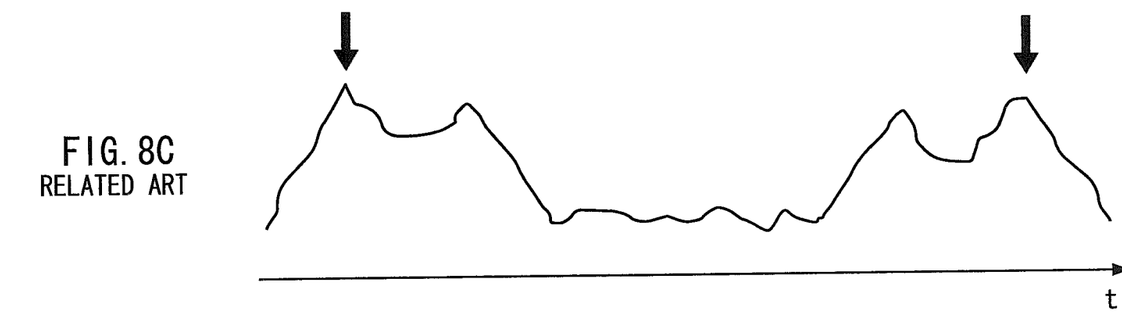

When multipath arises, there are cases in which the time position of the FFT window that the correlator detects is not an appropriate position. For example, at the time of receipt of a two-wave multipath, a correlation output such as shown in FIG. 8C, in which the respective correlation outputs shown in FIG. 8A and FIG. 8B are combined, is obtained. If the correlation output has plural peaks in this way, time synchronization is unstable, and there are cases in which the time position of the FFT window that the correlator detects is extremely close to either one of the two arrival waves, and there are cases in which the other path component does not appear correctly in the delay profile.

Figure 9A:
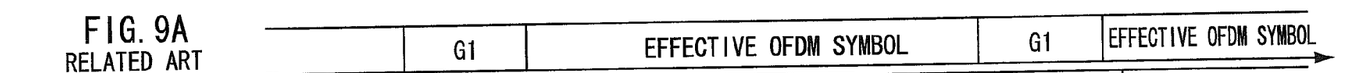
FIGS. 9A through 9F are explanatory drawings explaining the problematic point that an incorrect delay profile is generated when a delay profile window is not at an appropriate time position in a case in which multipath occurs.
Figure 9B:
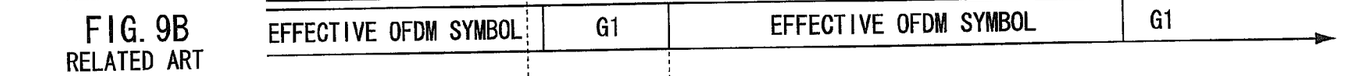
Figure 9C:
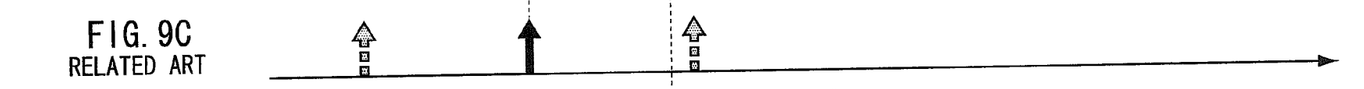
Figure 9D:
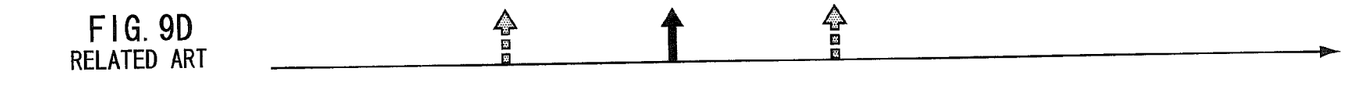

Specifics will be described with reference to FIG. 9A through FIG. 9F. FIG. 9A and FIG. 9B show the two arrival waves that are received. FIG. 9C and FIG. 9D show the delay profiles generated from FIG. 9A and FIG. 9B, respectively.

Figure 9E:
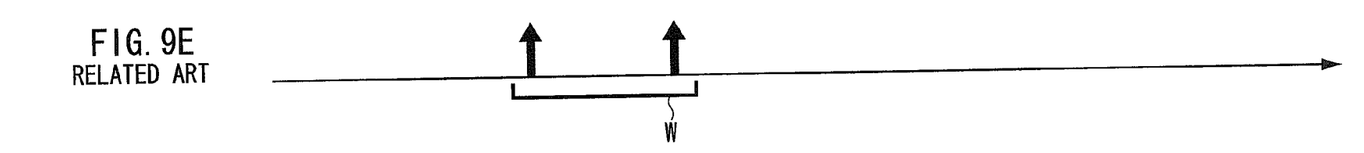
Figure 9F:
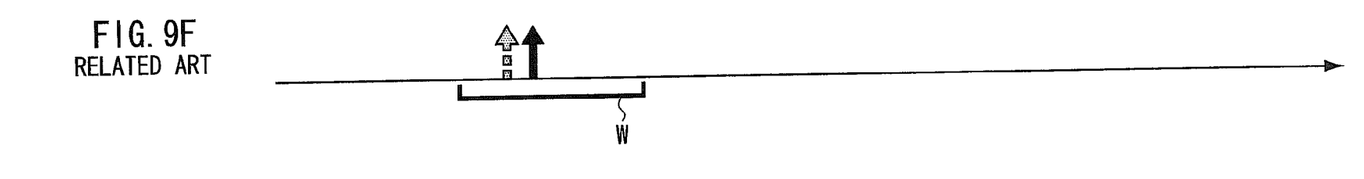

In the same way as in FIG. 6B, FIGS. 9A through 9F also include unnecessary path information. However, if the delay profile window W is made to be the appropriate time position, as shown in FIG. 9E, the path information of the two arrival waves can be extracted, and correct delay profile information can be generated. However, in a case in which the time position of the FFT window that the correlator detects is not appropriate, the delay profile window W also is not set at the appropriate position, and, as shown in FIG. 9F, unnecessary path information is taken-in and an incorrect delay profile is generated.

When the time position of the delay profile window W is determined by using correlator output in this way, there are cases in which a good delay profile cannot be generated.

SUMMARY OF THE INVENTION

An object of the present invention is to provide a delay profile generator that can move a delay profile window to an appropriate time position and can generate an accurate delay profile from which necessary components are extracted.

In order to achieve the above object, a delay profile generator relating to the present invention is structured to include: a delay profile generating component extracting pilot symbols from an OFDM signal in which pilot symbols are scattered among data symbols in a frequency direction and a time direction and which is modulated, and generating, from the extracted pilot symbols, a delay profile expressing a time axis distribution of a delay wave; a delay profile extracting component that, by using a delay profile window expressing a time position for extracting a necessary delay profile, extracts a delay profile within the window from the delay profile generated by the delay profile generating component; an integrating component that, in the delay profile extracted by the delay profile extracting component, integrates a signal component of a delay profile of a first time period, and integrates a signal component of a delay profile of a second time period that does not overlap the first time period; a comparing component comparing integration values of the two time periods obtained by the integrating component; and a correcting component correcting a time position of the delay profile window on the basis of results of comparison of the comparing component.

DETAILED DESCRIPTION OF THE INVENTION

Preferred exemplary embodiments of the present invention will be described in detail hereinafter with reference to the drawings.

First Exemplary Embodiment

Figure 1:
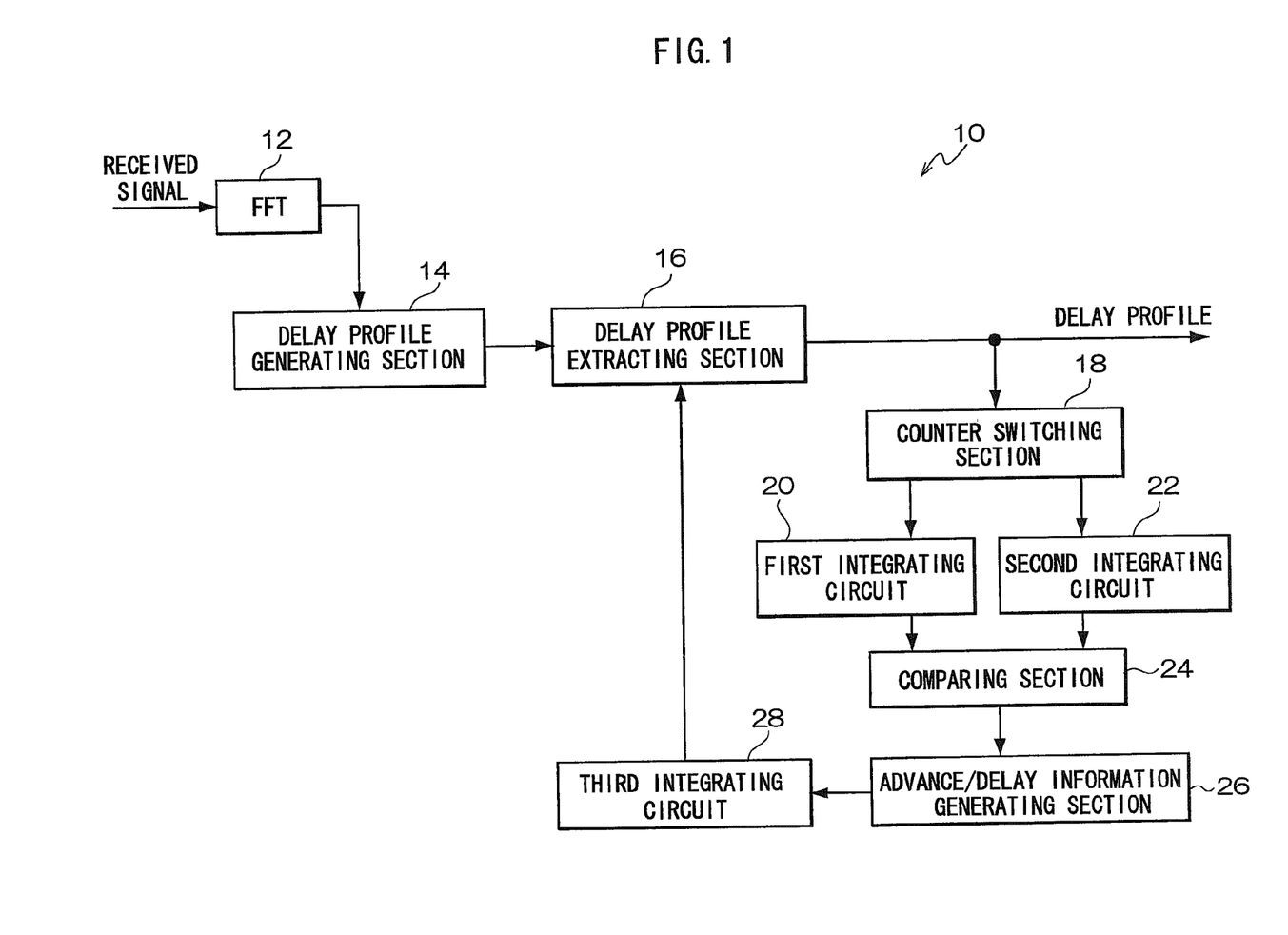
FIG. 1 is a schematic structural diagram of a delay profile generator relating to a first exemplary embodiment.

FIG. 1 is a schematic structural diagram of a delay profile generator 10 provided at a demodulating device of an OFDM (Orthogonal Frequency Division Multiplexing) signal relating to a first exemplary embodiment of the present invention.

The OFDM signal that is the object of processing of the delay profile generator 10 is a signal that is modulated by a scattered pilot system. An example of a frame structure, that shows the arrangement relationship of pilot symbols and data symbols, is shown in FIG. 5. Time (the OFDM symbols) is shown on the vertical axis in FIG. 5, and frequency on the horizontal axis. The black dots in FIG. 5 represent the pilot symbols, and the white dots represent the data symbols. In this example, the same symbol arrangement appears at one cycle in four OFDM symbols, but the symbol arrangement is not limited to this cycle.

As shown in FIG. 1, the delay profile generator 10 relating to the present exemplary embodiment has an FFT (Fast Fourier Transform) section 12, a delay profile generating section 14, a delay profile extracting section 16, a counter switching section 18, a first integrating circuit 20, a second integrating circuit 22, a comparing section 24, an advance/delay information generating section 26, and a third integrating circuit 28.

The fast Fourier transform section 12 carries out Fourier transformation on and demodulates an inputted OFDM signal. Due to this Fourier transformation, a time axis signal is converted into a frequency axis signal.

The delay profile generating section 14 extracts pilot symbols from the inputted signal after the Fourier transformation, in which pilot symbols and data symbols both exist. As mentioned above, the pilot symbols are scattered in the inputted signal at a predetermined cycle, and these pilot symbols that are scattered at the predetermined cycle are extracted. Here, a concrete image of the extraction will be described. For simplicity, the pilot symbols are denoted by P, and the data symbols are denoted by D. Assuming that the data array of the inputted signal is DDDPDDDPDDDPDDD for example, the image of the extraction is that the Ds are replaced by 0s (zeros). In this case, the data array of the signal after extraction is 000P000P000P000. Then, the delay profile generating section 14 inverse Fourier transforms the results of extraction of the pilot symbols, and converts into a time axis signal. This becomes a delay profile expressing the delay time distribution of the delay path, but, at this point in time, unnecessary path information is included.

From the physical properties, the maximum time length of a delay profile that can be computed corresponds to the product of the reciprocal of the subcarrier interval at which the pilot symbols are arranged and the effective OFDM symbol length. For example, in the case of a symbol array in which the same symbol arrangement appears at one cycle in four OFDM symbols such as shown in FIG. 5, if a delay profile is generated by using four successive OFDM symbols or more, the subcarrier interval at which the pilot symbols are arrayed is three subcarriers, and the maximum time length of the delay profile that can be computed is ⅓ of the effective OFDM symbol length. Accordingly, output that exists in the time region other than the ⅓ is unnecessary path information that is generated by repeated cycles (refer to FIG. 6B as well).

By using the delay profile window W (the window showing the time position for extracting the needed path information), the delay profile extracting section 16 extracts and outputs path information that is at the needed time position, from the delay profile that is generated by the delay profile generating section 14 and that includes unnecessary path information.

Namely, due to the delay profile extracting section 16 extracting the path information that is within the time position of the delay profile window W, a delay profile from which the unnecessary path information is eliminated is generated. Note that the delay profile extracting section 16 uses the time position of the delay profile window W by moving the time position of the delay profile window W on the basis of position control information inputted from the third integrating circuit 28.

The extraction results of the delay profile extracting section 16 are inputted to the counter switching section 18. Then, the counter switching section 18 switches, at a time position, the output destination of the inputted delay profile. Specifically, the counter switching section 18 sections the length of time from the start position to the end position of the predetermined delay profile window W, at the center of this length of time. From among the extraction results of the delay profile extracting section 16, the counter switching section 18 outputs, to the first integrating circuit 20, the delay profile of the time period before that central time position, and outputs, to the second integrating circuit 22, the delay profile of the time period after the central time position. In this way, the counter switching section 18 switches the output path of the delay profile inputted from the delay profile extracting section 16.

The first integrating circuit 20 and the second integrating circuit 22 respectively integrate the signal components (electric powers) of the inputted delay profiles, and output the results to the comparing section 24.

The formula of the integration carried out by the first integrating circuit 20 that integrates the first half portion is as follows.

$$\text{psum\_fir}(T) = \sum_{t=0}^{L/2} \text{d\_prof}(T, t)^2 \qquad \text{[Formula 1]}$$

The formula of the integration carried out by the second integrating circuit 22 that integrates the second half portion is as follows.

$$\text{psum\_lat}(T) = \sum_{t=L/2}^{L} \text{d\_prof}(T, t)^2 \qquad \text{[Formula 2]}$$

Note that, in the above two integration formulas, T is the OFDM symbol time, t is the profile time, L is the time length of the delay profile window W, psum_fir(T) is the output of the first integrating circuit 20, psum_lat(T) is the output of the second integrating circuit 22, and d_prof(T,t) is the delay profile.

The comparing section 24 compares the output of the first integrating circuit 20 and the output of the second integrating circuit 22 by using the following formula, and outputs the results of comparison to the advance/delay information generating section 26.

$$\text{comp\_pf}(T) = \begin{cases} 1 & \text{psum\_fir}(T) > \alpha^*\text{psum\_lat}(T) \\ -1 & \text{psum\_lat}(T) < \alpha^*\text{psum\_fir}(T) \\ 0 & \text{other than the above} \end{cases} \qquad \text{[Formula 3]}$$

Note that $\alpha$ is the comparison coefficient, and $1<\alpha$. Further, comp_pf(T) is the comparison output. As is clear from the above formula, in a case in which the output from the first integrating circuit 20 is greater than the value which is the product of the comparison coefficient a and the output from the second integrating circuit 22 (called the "first condition" hereinafter), the comparing section 24 outputs 1. In a case in which the output from the second integrating circuit 22 is smaller than the value which is the product of the comparison coefficient $\alpha$ and the output from the first integrating circuit 20 (called the "second condition" hereinafter), the comparing section 24 outputs −1. In a case that does not correspond to either of the first or second conditions, the comparing section 24 outputs 0.

On the basis of the comparison output inputted from the comparing section 24, the advance/delay information generating section 26 outputs a signal showing the amount of correction (the advancing amount or the delay amount) at the time of correcting the time position of the delay profile window W. Note that, in the following description, the signal expressing this correction amount is called the advance/delay information. The formula at the time when the advance/delay information generating section 26 generates the advance/delay information is as follows.

$$\text{comp\_ap}(T) = \beta^*\text{comp\_pf}(T) \qquad \text{[Formula 4]}$$

Here, $\beta$ is the movement coefficient, and comp_ap(T) is the advance/delay information. Namely, the advance/delay information generating section 26 outputs, as the advance/delay information, a value which is the product of the movement coefficient $\beta$ and the output results of the comparing section 24. Note that, in the case in which the output from the comparing section 24 is 0, the advance/delay information also is 0. Namely, in the comparison of magnitudes at the comparing section 24, in a case in which the two integration values do not correspond to either the first condition or the second condition, correction is not carried out. In this way, superfluous correction is not carried out.

The third integrating circuit 28 integrates the advance/delay information from the advance/delay information generating section 26, and outputs the results of this integration to the delay profile extracting section 16 as position control information of the delay profile window W. Namely, the third integrating circuit 28 cumulatively adds the advance/delay information inputted from the advance/delay information generating section 26, determines the amount of correction from the reference time position of the delay profile window W, and outputs this as position control information.

In accordance with the position control information inputted from the third integrating circuit 28, the delay profile extracting section 16 moves the time position of the delay profile window W to a time position that is apart, by the correction amount expressed by the position control information, from the reference time position of the delay profile window W. Then, by using the moved delay profile window W, the delay profile extracting section 16 extracts and outputs the path information at the needed time position from the delay profile that is generated at the delay profile generating section 14 and includes unnecessary path information.

As is clear from the comparison formula used at the comparing section 24 and the formula used at the advance/delay information generating section 26, in the present exemplary embodiment, a correction amount (here, −β or β) within a predetermined range is generated provided that the integration value of the first integrating circuit 20 and the integration value of the second integrating circuit 22 satisfy a predetermined relationship of magnitudes at the comparing section 24, regardless of the magnitude of the difference between the integration values of the first integrating circuit 20 and the second integrating circuit 22. The third integrating circuit 28 accumulates this correction amount and outputs it to the delay profile extracting section 16, and correction is carried out gradually. Namely, the delay profile window W is not moved all at once by the correction amount that corresponds to the magnitude of the difference between the integration values of the first integrated circuit 20 and the second integrated circuit 22, and rather, the delay profile window W is moved gradually. In this way, it is possible to prevent the transfer path from fluctuating suddenly and the time position of the delay profile window W from moving suddenly to a position that is different than the original position.

More specific explanation will be given here by using, as an example, position control of the delay profile window W at the time of receiving a two-wave multipath having a large arrival time difference.

Figures 2A, 2B:
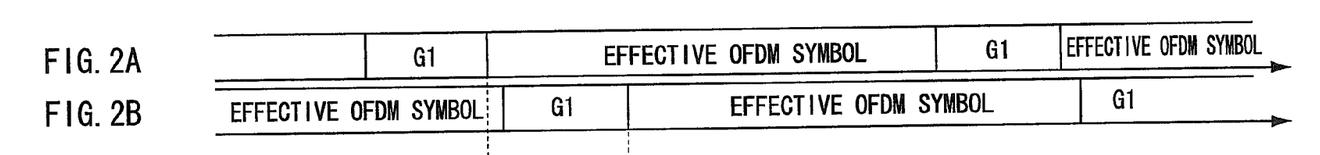
FIGS. 2A through 2G are explanatory drawings for explaining processing of extracting necessary path information by moving a delay profile window from a delay profile generated from two arrival waves that are received.
Figure 2C:
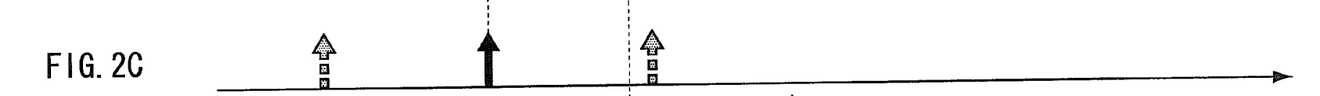
Figure 2D:
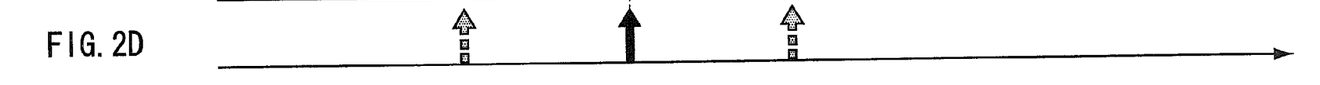

FIG. 2A and FIG. 2B show the two arrival waves that are received, and FIG. 2C and FIG. 2D show the delay profiles that are generated from FIG. 2A and FIG. 2B respectively.

Figures 2E, 2F:
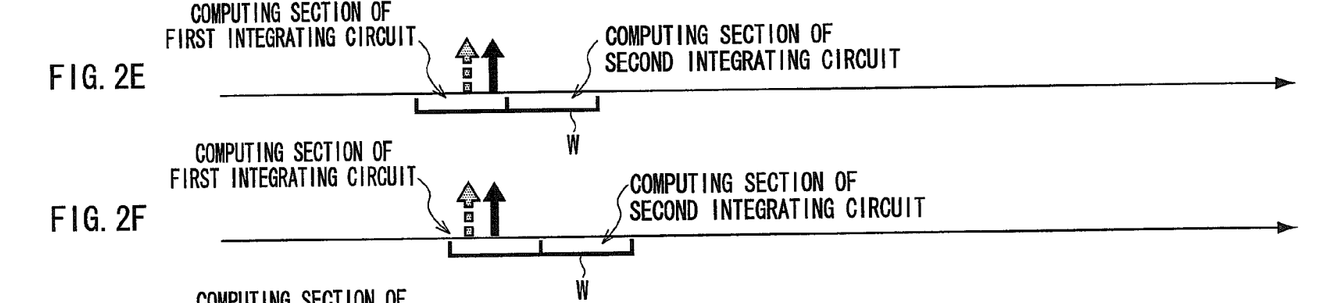

Further, the reference time position of the delay profile window W is shown in FIG. 2E. As shown in FIG. 2C and FIG. 2D, because unnecessary path information is included in the generated delay profiles, if a delay profile is extracted by using the delay profile window W of the reference time position, even unnecessary path information will be extracted as shown in FIG. 2E.

In the above-described exemplary embodiment, the results of extraction at this time are divided by the counter switching section 18 into a former half time period and a latter half time period of the time length of the delay profile window W, and signal components of these respective time periods are integrated separately by the first integrating circuit 20 and the second integrating circuit 22. The results thereof are compared at the comparing section 24, and if there is deviation of the integration values of the former half time period and the latter half time period, advance/delay information is generated in the direction in which that deviation disappears. Then, the third integrating circuit 28 generates position control information of the delay profile window W from the advance/delay information, and the delay profile extracting section 16 moves the position of the delay profile window W on the basis of the position control information.

A state in which the time position of the delay profile window W is moved from the reference position is shown in FIG. 2F. Even at this time position of the delay profile window W, unnecessary path information is still included. The delay profile generator 10 extracts the delay profile at this position, and, on the basis of the results of extraction, again generates position control information as described above. The time position of the delay profile window W is thereby moved further.

Figure 2G:
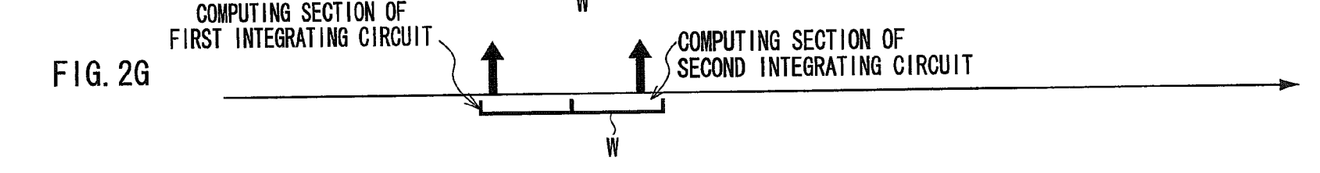

By gradually moving the position control information of the delay profile window W in this way, the delay profile window W can be moved to an appropriate time position as shown in FIG. 2G. In FIG. 2G, there is a state in which the unnecessary path information is excluded and the necessary path information is included within the time position of the delay profile window W. A delay profile of a needed time region can thereby be extracted.

Note that, in a case in which the delay profile window W is at the appropriate time position as shown in FIG. 2G, 0 is outputted as the results of comparison at the comparing section 24. Therefore, the advance/delay information generated at the advance/delay information generating section 26 also is 0, and position control information that does not differ from the position control information of the previous time is outputted from the third integrating circuit 28.

Second Exemplary Embodiment

Figure 3:
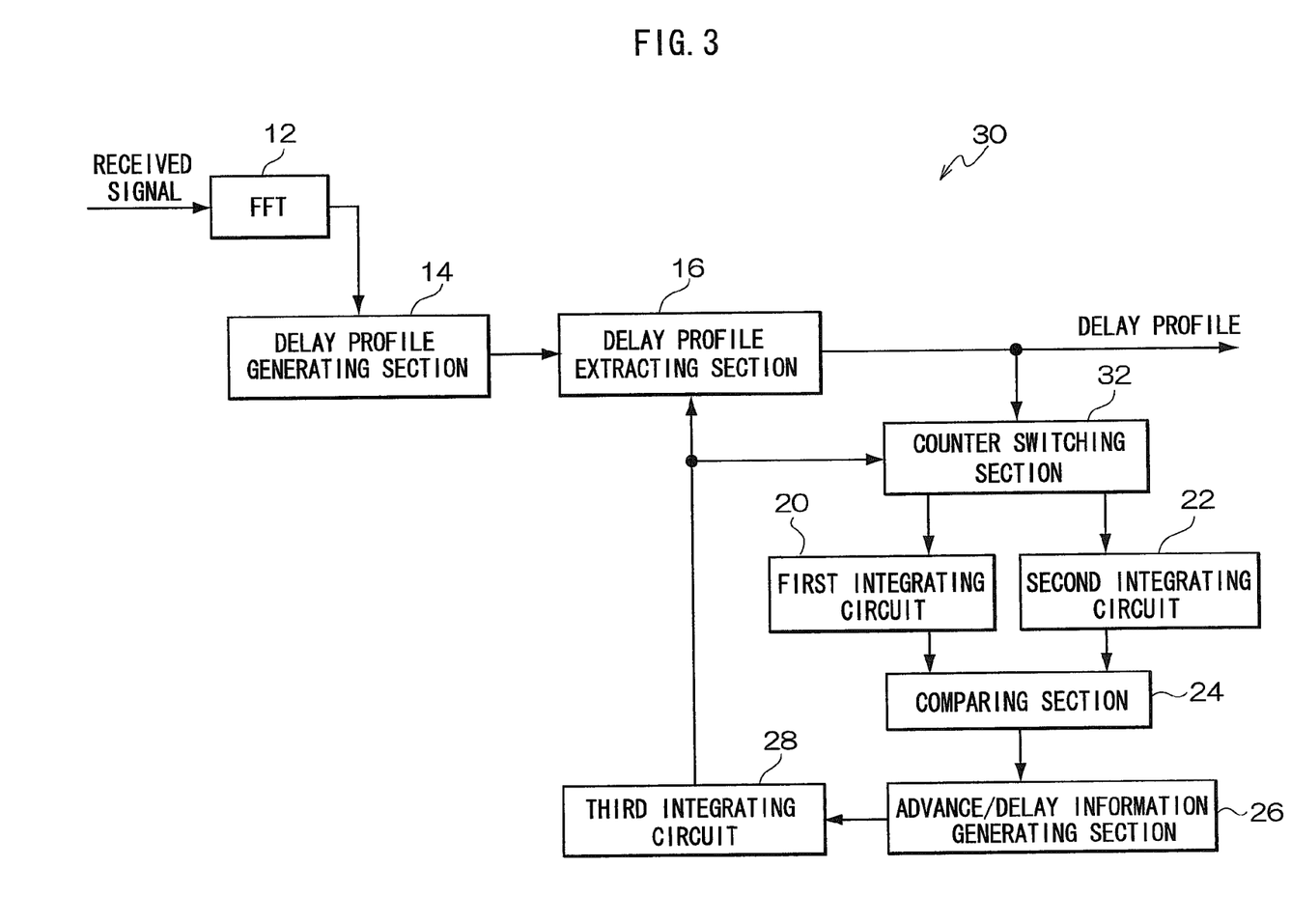
FIG. 3 is a schematic structural diagram of a delay profile generator relating to a second exemplary embodiment.

The differences between a delay profile generator 30 of the present exemplary embodiment and the delay profile generator 10 of the first exemplary embodiment are that, as shown in FIG. 3, a counter switching section 32 is provided instead of the counter switching section 18, and the position control information computed at the third integrating circuit 28 is inputted not only to the delay profile extracting section 16, but to the counter switching section 32 as well.

In the same way as the counter switching section 18 of the first exemplary embodiment, the counter switching section 32 of the present exemplary embodiment switches the output destination of the delay profile at a time position. However, in this case, the switching position can vary on the basis of the position control information of the third integrating circuit 28.

More specifically, first, the counter switching section 32 determines the integration end time position of the first integrating circuit 20 and the integration start time position of the second integrating circuit 22.

The formula at the time of determining the integration end time position of the first integrating circuit 20 is as follows.

$$Ctp\_fir(T)=L/2-\gamma*prf\_p(T-1)-Mi \qquad \text{[Formula 5]}$$

The formula at the time of determining the integration start time position of the second integrating circuit 22 is as follows.

$$Ctp\_lat(T)=L/2-\gamma*prf\_p(T-1)+Mi \qquad \text{[Formula 6]}$$

Note that T is the OFDM symbol time, Mi is a predetermined offset time, L is the delay profile window time length, Ctp_fir(T) is the integration end time position of the first integrating circuit 20, Ctp_lat(T) is the integration start time position of the second integrating circuit 22, prf_p(T) is the output of the third integrating circuit 28 (the delay profile window correction amount), and $\gamma$ is a coefficient for correcting the integration position.

Note that the offset time Mi may be set appropriately in accordance with the device, and may be 0. If the offset time Mi is 0, the integration end time position of the first integrating circuit 20 and the integrating start time position of the second integrating circuit 22 coincide.

Then, the counter switching section 32 outputs, to the first integrating circuit 20, the delay profile of the time period (the first half time period) from a predetermined offset time Mo until the integration end time position Ctp_fir(T) that was determined as described above. Further, the counter switching section 32 outputs, to the second integrating circuit 22, the delay profile of the time period (the second half time period) from the integration start time position Ctp_lat(T) that was determined as described above, until the time that is the delay profile window time length L minus the offset time Mo. Note that the offset time Mo may be set appropriately in accordance with the device, and may be 0.

In this way, the following integration computation is carried out at the first integrating circuit 20.

$$psum\_fir(T) = \sum_{t=Mo}^{Ctp\_fir(T)} d\_prof(T,t)^2 \qquad \text{[Formula 7]}$$

Further, the following integration computation is carried out at the second integrating circuit 22.

$$\text{psum\_lat}(T) = \sum_{t=Ctp\_lat(T)}^{L-Mo} \text{d\_prof}(T, t)^2 \quad \text{[Formula 8]}$$

Note that, in the above two integration formulas, T is the OFDM symbol time, t is the delay profile time, L is the delay profile window time length, Mo is the offset time, psum_fir (T) is the output of the first integrating circuit 20, psum_lat(T) is the output of the second integrating circuit 22, d_prof(T,t) is the delay profile, Ctp_fir(T) is the integration end time position of the first integrating circuit 20 that was determined as described above, and Ctp_lat(T) is the integration start time position of the second integrating circuit 22 that was determined as described above.

In this way, in the second exemplary embodiment, by making the integration time periods of the first integrating circuit 20 and the second integrating circuit 22 variable, the following effect is achieved in addition to the effects obtained by the first exemplary embodiment: even in a case in which the delay profile window W is moved such that unnecessary path information is mistakenly included in the delay profile window W by varying the transfer path suddenly, the integration time is automatically varied which is different than in the delay profile generator 10 of the first exemplary embodiment in which a tracking range of the delay profile window W is not provided, and therefore, the time position of the delay profile window W can be prevented from continuing to move to a position that is different than the original position.

The delay profile generator relating to the present invention is structured to include: a delay profile generating component extracting pilot symbols from an OFDM signal in which pilot symbols are scattered among data symbols in a frequency direction and a time direction and which is modulated, and generating, from the extracted pilot symbols, a delay profile expressing a time axis distribution of a delay wave; a delay profile extracting component that, by using a delay profile window expressing a time position for extracting a necessary delay profile, extracts a delay profile within the window from the delay profile generated by the delay profile generating component; an integrating component that, in the delay profile extracted by the delay profile extracting component, integrates a signal component of a delay profile of a first time period, and integrates a signal component of a delay profile of a second time period that does not overlap the first time period; a comparing component comparing integration values of the two time periods obtained by the integrating component; and a correcting component correcting a time position of the delay profile window on the basis of results of comparison of the comparing component.

In this way, by comparing the integration values of two time periods of a delay profile extracted by using a delay profile window, and correcting the time position of the delay profile window, the delay profile window can be moved to a suitable time position, and an accurate delay profile can be generated.

Note that the first time period may be a former-half time period when a time length of the extracted delay profile is divided into two time periods at a center of the time length, and the second time period may be a latter-half time period.

Further, the integrating component may change the first time period and the second time period on the basis of a time length of the extracted delay profile and a correction amount of the correcting component.

Note that the correcting component may correct the time position of the delay profile window in a case in which a relationship of magnitudes of the two integration values is judged to satisfy a predetermined condition at the comparing component.

Further, the correcting component may compute and accumulate a correction amount within a predetermined range each time the integration values of the two time periods are computed at the integrating component, and may move the time position of the delay profile window to a time position that is apart from a reference window position by the accumulated correction amount.

As described above, in accordance with the present invention, a delay profile window can be moved to a suitable time position, and an accurate delay profile from which the necessary components are extracted can be generated.

What is claimed is:

1. A delay profile generator comprising:
   a delay profile generating component that extracts pilot symbols from an OFDM signal in which pilot symbols are scattered among data symbols in a frequency direction and a time direction and which is modulated, and generates, from the extracted pilot symbols, a delay profile representing a time axis distribution of a delay wave;
   a delay profile extracting component that, by using a delay profile window representing a time position for extracting a necessary delay profile, extracts a delay profile within the window from the delay profile generated by the delay profile generating component;
   an integrating component that, in the delay profile extracted by the delay profile extracting component, integrates a signal component of a delay profile of a first time period, and integrates a signal component of a delay profile of a second time period that does not overlap the first time period;
   a comparing component that compares integration values of the two time periods obtained by the integrating component; and
   a correcting component that corrects a time position of the delay profile window on the basis of results of comparison of the comparing component.

2. The delay profile generator of claim 1, wherein the first time period is a former-half time period when a time length of the extracted delay profile is divided into two time periods at a center of the time length, and the second time period is a latter-half time period.

3. The delay profile generator of claim 1, wherein the integrating component changes the first time period and the second time period on the basis of a time length of the extracted delay profile and a correction amount of the correcting component.

4. The delay profile generator of claim 1, wherein the correcting component corrects the time position of the delay profile window in a case in which a relationship of magnitudes of the two integration values is judged to satisfy a predetermined condition at the comparing component.

5. The delay profile generator of claim 1, wherein the correcting component computes and accumulates a correction amount within a predetermined range each time the integration values of the two time periods are computed at the integrating component, and moves the time position of the delay profile window to a time position that is apart from a reference window position by the accumulated correction amount.

6. A method of correcting a time position of a delay profile window in a delay profile generator, the method comprising:

(a) extracting pilot symbols from an OFDM signal in which pilot symbols are scattered among data symbols in a frequency direction and a time direction and which is modulated, and generating, from the extracted pilot symbols, a delay profile representing a time axis distribution of a delay wave;

(b) by using a delay profile window representing a time position for extracting a necessary delay profile, extracting a delay profile within the window from the delay profile generated in (a);

(c) in the delay profile extracted in (b), integrating a signal component of a delay profile of a first time period, and integrating a signal component of a delay profile of a second time period that does not overlap the first time period;

(d) comparing integration values of the two time periods obtained in (c); and (e) correcting a time position of the delay profile window on the basis of results of comparison of (d).

7. The method of correcting a time position of a delay profile window of claim 6, wherein the first time period is a former-half time period when a time length of the extracted delay profile is divided into two time periods at a center of the time length, and the second time period is a latter-half time period.

8. The method of correcting a time position of a delay profile window of claim 6, wherein the first time period and the second time period are changed on the basis of a time length of the extracted delay profile and a correction amount of (e).

9. The method of correcting a time position of a delay profile window of claim 6, wherein the time position of the delay profile window is corrected in a case in which a relationship of magnitudes of the two integration values is judged to satisfy a predetermined condition in (d).

10. The method of correcting a time position of a delay profile window of claim 6, wherein a correction amount within a predetermined range is computed and accumulated each time the integration values of the two time periods are computed, and the time position of the delay profile window is moved to a time position that is apart from a reference window position by the accumulated correction amount.

* * * * *